Nov. 6, 1928. 1,690,176
C. PAYNE
MACHINE FOR MIXING GYPSUM STUCCO
Filed Aug. 22, 1927   3 Sheets-Sheet 2
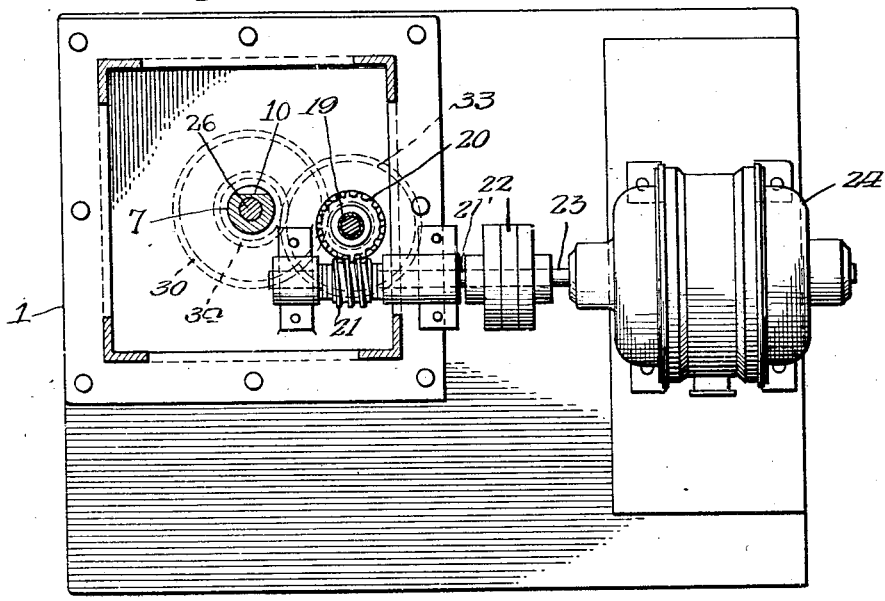
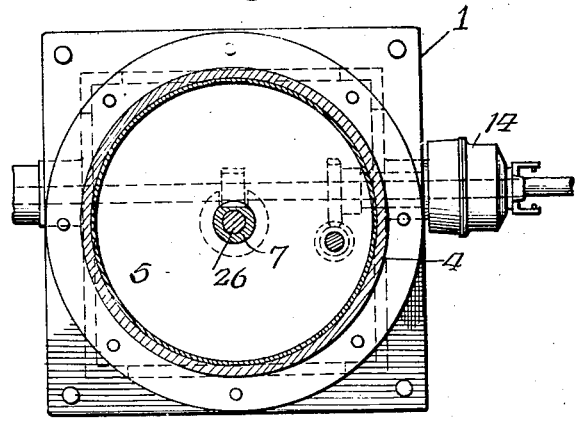
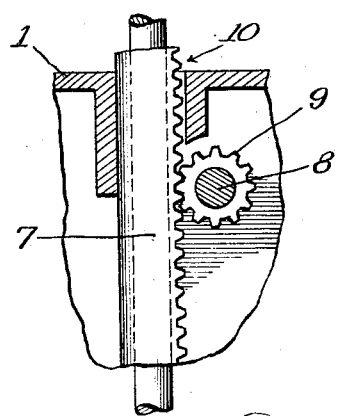
Inventor:
Caleb Payne
By Wm O Bell Atty.

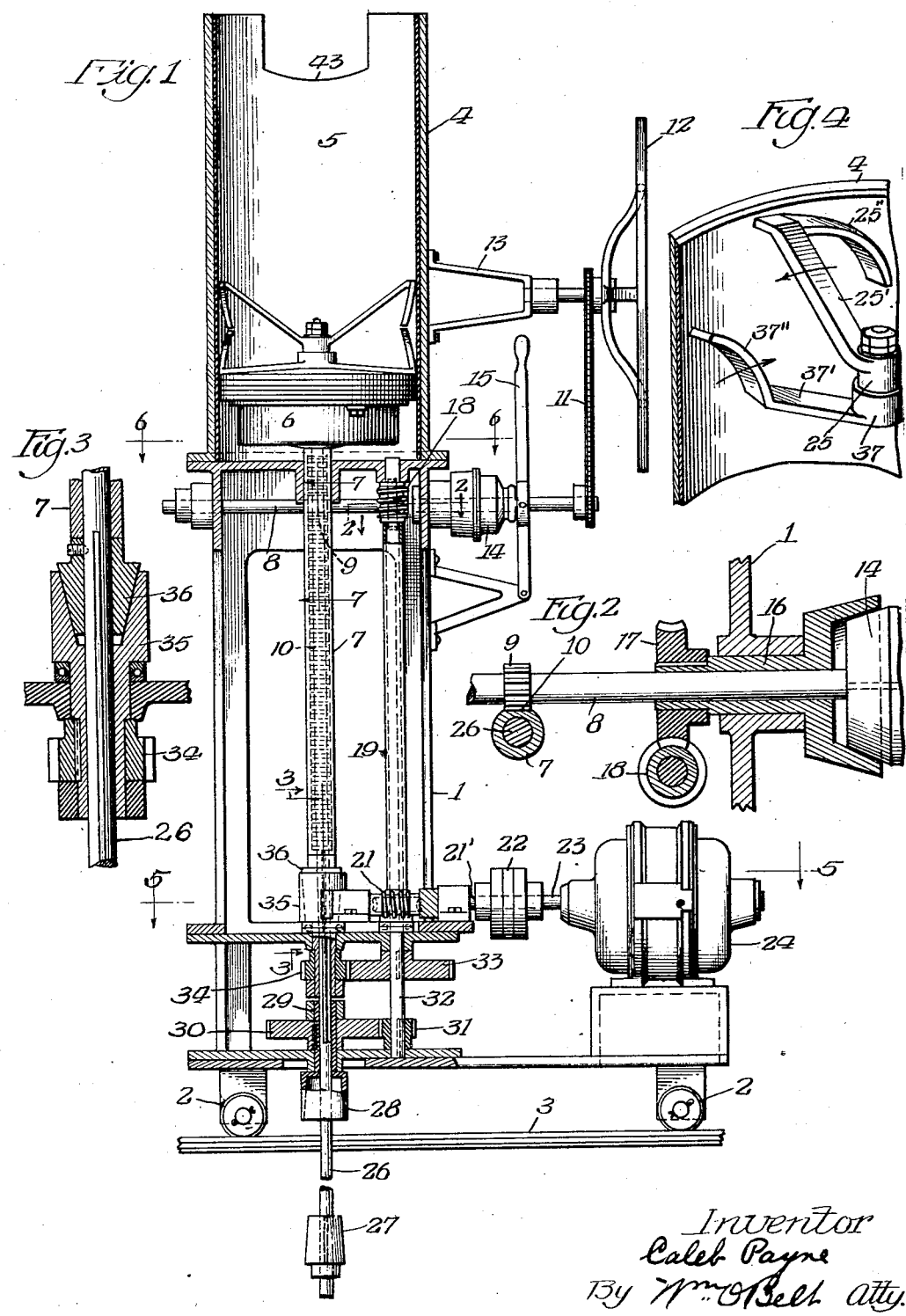

Nov. 6, 1928.
C. PAYNE
1,690,176
MACHINE FOR MIXING GYPSUM STUCCO
Filed Aug. 22, 1927    3 Sheets-Sheet 3
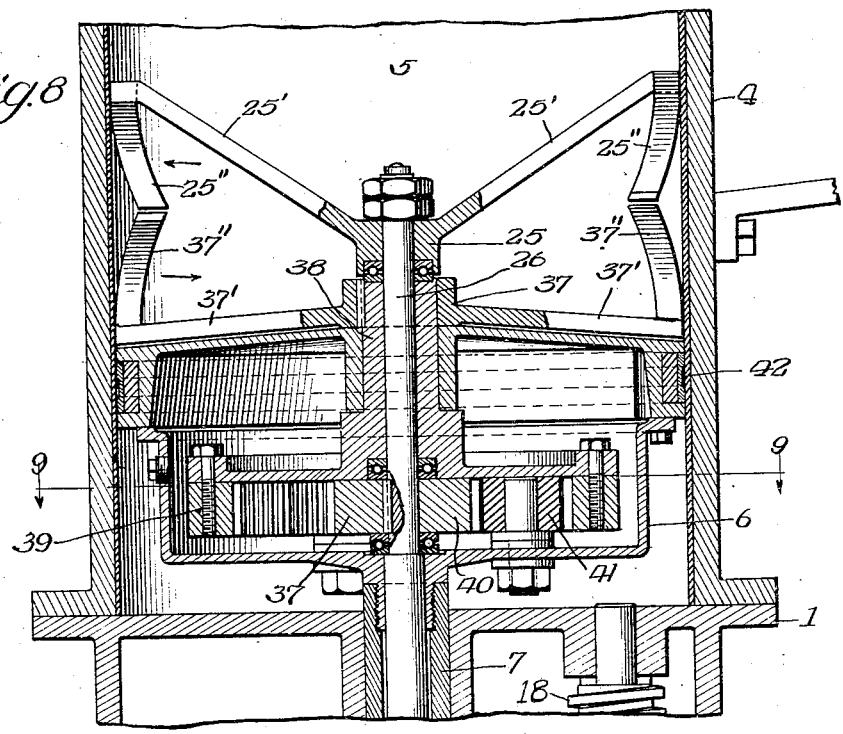
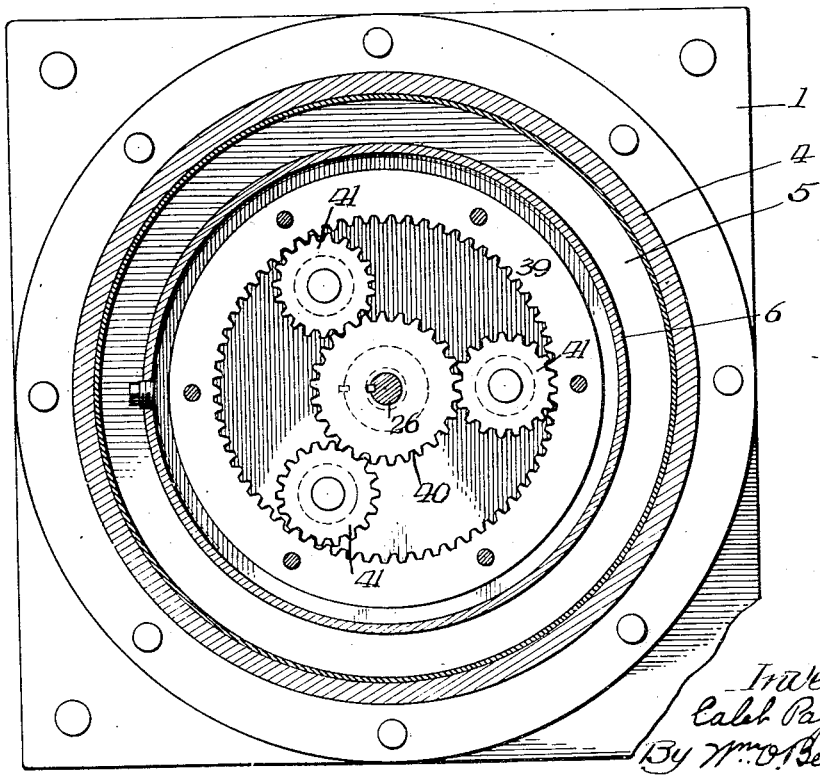

Patented Nov. 6, 1928.

1,690,176

UNITED STATES PATENT OFFICE.

CALEB PAYNE, OF CHICAGO, ILLINOIS, ASSIGNOR TO GYPSUM ENGINEERING AND MANUFACTURING CO., OF CHICAGO, ILLINOIS, A CORPORATION OF ILLINOIS.

MACHINE FOR MIXING GYPSUM STUCCO.

Application filed August 22, 1927. Serial No. 214,576.

This invention relates to mixing machines and its object is primarily to provide a novel machine of simple construction which can be easily operated for mixing gypsum stucco in batches or as a continuous operation.

Another important object of the invention is to provide a mixer for thoroughly mixing calcined gypsum and water to obtain a mix of uniform consistency.

It is a well known fact that gypsum stucco is difficult to mix because of its tendency to build up on the parts with which it contacts and requiring the mixing operation to be discontinued from time to time to permit the parts to be cleaned.

Other objects of the invention are to provide a novel mixer which will produce a thorough incorporation of the water with the calcined gypsum without allowing an accumulation of set material to form on the paddles or on the side walls of the mixing chamber, which will prevent the material from building up on the paddles and walls of the mixing chamber and clogging the paddles, and which will avoid the delays heretofore occasioned by the necessity for cleaning the mixer from time to time.

With these and other objects in view I have illustrated the invention in a selected embodiment in the accompanying drawings referring to which:

Fig. 1 is a vertical sectional view.

Fig. 2 is a detail enlarged sectional view on the line 2—2 of Fig. 1.

Fig. 3 is a detail enlarged sectional view on the line 3—3 of Fig. 1.

Fig. 4 is a detail enlarged view showing a portion of the mixing chamber and parts of the paddles.

Fig. 5 is a transverse sectional view on the line 5—5 of Fig. 1.

Fig. 6 is a transverse sectional view on the line 6—6 of Fig. 1.

Fig. 7 is an enlarged sectional view on the line 7—7 of Fig. 1.

Fig. 8 is an enlarged vertical sectional view through the paddle head and a portion of the mixing chamber and main frame.

Fig. 9 is a transverse sectional view on the line 9—9 of Fig. 8.

Referring to the drawings 1 is the main or supporting frame of the machine which is conveniently mounted on wheels 2 to travel on a track 3 so that the mixer can be easily moved about from place to place as required. The supporting frame can be set in stationary position if preferred.

A cylinder 4 containing a mixing chamber 5 is mounted upon the frame and a paddle head 6 is arranged to travel up and down in the mixing chamber. This paddle head is mounted on a tubular support 7 which operates through an opening in the bottom of the mixing chamber. A transverse shaft 8 is supported in the main frame and it carries a pinion 9 which meshes with a rack 10 formed by recessing the tubular support 7; and by operating this shaft the paddle head can be raised and lowered in the mixing chamber. The shaft 8 is connected by a sprocket chain 11 with a hand wheel 12 mounted on a bracket 13 supported on the cylinder 4 whereby the shaft may be rotated by hand. A clutch 14 on the shaft 8 is adapted to be operated by a lever 15 for engaging the shaft with a sleeve 16 loose on the shaft and carrying a worm pinion 17 which meshes with a worm 18 on a vertical shaft 19, Fig. 2. Another worm pinion 20, Fig. 5, on the shaft 19 meshes with a worm 21 on a worm shaft 21' which is connected by a coupling 22 with the shaft 23 of a motor 24. Thus provision is made for raising and lowering the paddle head by hand or by power, as may be desired.

The upper paddle 25 is mounted on a shaft 26 which extends down through the paddle head and through the frame of the machine and carries the cone 27 which is adapted for operative engagement with the socket 28 of a cone clutch. This socket is rigid on a sleeve 29 which carries a gear 30 meshing with a pinion 31 on the shaft 32, which is made rigid with the shaft 19 and is operated by the worm and pinion 21—20. A gear 33 on the shaft 32 drives a pinion 34 which is rigid with a socket 35 adapted to receive a cone 36 of another cone clutch, Fig. 3. The cone 27 and the cone 36 of the two clutches are rigid on the shaft 26 in suitably spaced relation to permit of the desired travel of the paddle head in the mixing chamber. The socket members 28 and 35 of the two clutches are mounted in the frame of the machine and are driven at different rates of speed from the shaft 32 through the pinion 31 and through the gear 33. The lower paddle 37 is mounted on the hub 38 of an internal gear 39. A gear 40 rigid with the shaft 26 carrying the upper paddle 37 meshes with idle pinions 41 which in turn mesh with the internal gear 39 whereby the paddles are caused to travel in opposite directions and at different rates of speed, the upper paddle traveling at a higher rate of speed than the lower paddle. When the clutch, 35, 36 is in engagement the paddle shaft 26 will be operated at a relatively high rate of speed by the gear 33 and the pinion 34, and when the clutch 27, 28 is in engagement the paddle shaft will be operated at a relatively low rate of speed by the pinion 31 and the gear 30, and in both cases the upper paddle 25 will operate at a higher rate of speed than the lower paddle.

The planetary gearing for driving the lower paddle is housed within the paddle head which forms a bottom for the paddle chamber, and is provided peripherally with suitable packing rings 42 to prevent any part of the mix from passing below the head.

The upper paddle 25 has two oppositely directed and upwardly inclined arms 25′ provided at their outer ends with downwardly curved trailing fingers 25″, Fig. 8. The lower paddle has two oppositely directed arms 37′ provided at their outer ends with upwardly curved trailing fingers 37″. The top of the paddle head is slightly inclined from the center and the arms 37′ are substantially parallel therewith and operate in scraping relation thereto. The fingers 25″ of the upper paddle and the fingers 37″ of the lower paddle scrape the inner surface of the mixing chamber 5 and they are arranged to clear each other in the oppositely directed movement of the paddles.

I prefer to run the upper paddle at a higher rate of speed than the lower paddle, as herein described, but with some materials and for some purposes it will be entirely satisfactory to run both paddles at the same rate of speed, or to run the lower paddle at a higher rate of speed than the upper paddle. Variable speeds may be readily obtained by simple changes in the planetary gearing. It is, however, highly important that the paddles should travel in opposite directions and this is largely because of the peculiar properties of gypsum stucco which require violent agitation. As I have stated, the gypsum stucco tends to build up on all the parts with which it contacts within the mixer, but I have found that this is avoided by providing paddles which keep the inside wall of the mixing chamber clean and which travel at a relatively high rate of speed and create a cleansing splash which prevents the stucco from building up on the paddles themselves. In batch mixing the operation of the paddle head as a plunger cleans the wall of the mixing chamber above the paddles and prevents the stucco from building up there. In both batch mixing and continuous mixing the splash of the stucco created by the rapidly revolving paddles also prevents the stucco from building up on the wall of the mixing chamber.

In the operation of the paddles, the stucco within the paddles is thrown outward by centrifugal force and the fingers of the paddles operate on the stucco adjacent to the wall of the cylinder. The fingers of the lower paddle throw the stucco upward and the fingers of the upper paddle throw the stucco downward so that the stucco within the range of operation of the paddles is kept in a high state of agitation. If the paddle head is set for batch mixing at the bottom of the mixing chamber and the chamber is substantially full of stucco, the agitation of the stucco produced by the paddles will cause the stucco to move up and down in the chamber and pass through the zone of operation of the paddles so that the entire quantity of material in the chamber is subjected to the violent agitation and mixing operation of the paddles. In other words, the oppositely operating paddles produce a thorough mixing agitation of the material within the zone of operation of the paddles, and more than this they produce a movement of the material in the chamber which brings all of the material at some time or another into the zone of operation of the paddles so that the entire quantity of material is thoroughly agitated and mixed. Whether the mixer is operating as a batch or as a continuous mixer all of the material which enters the chamber will at some time pass through the zone of operation of the paddles and become thoroughly agitated and mixed.

The paddle head is lowered to down position with the clutch 35, 36 thrown into engagement so that the paddle shaft 26 will be operated at high speed by the screw 33 and the pinion 34. Then the materials for the mix are introduced in the mixing chamber and the motor is started in operation. The paddles are operated at high speed in different directions and at different rates of speed to thoroughly incorporate the water with the calcined gypsum. This requires about thirty seconds and then the operator throws in the clutch 14 to operate the shaft 8 which causes the pinion 9 to operate the rack 10 for raising the tubular support 7 and the paddle head to discharge the mix through the side opening 43. As the paddle head moves upward the clutch 35, 36 is disengaged and the paddle stops revolving. As the paddle head moves upward as a plunger it scrapes and cleans the side wall of the mixing chamber. As the paddles and paddle head reach the upward limit of their movement in the mixing chamber the clutch 27, 28 is thrown into engagement to operate the paddles at a relatively low rate of speed for cleaning the wall of the mixing chamber at the upper end thereof above the paddle head. At this time the paddles revolve at a relatively low rate of speed to avoid scattering the mix. Then the clutch 14 is thrown out and the paddle head is permitted to lower to down position by gravity. The hand wheel 12 may be operated to raise and to lower the plunger if desired.

In batch mixing the capacity of the mixing chamber will ordinarily conform with the size of the mold so that one charge of the chamber will be sufficient to fill one mold; in continuous mixing the capacity of the mixing chamber is controlled by the speed of operation and the lifting force of the paddles because it is desirable to carry on the mixing operation without causing the mix to splash out of the top of the chamber. The machine herein shown and described is adapted for use as a batch mixer or as a continuous mixer. In Fig. 1 the machine is shown with the parts in operative position for use as a batch mixer. To adjust the machine for use as a continuous mixer the paddle head is elevated to a position closer to the top of the mixing chamber and the cone 36 is correspondingly adjusted for operative engagement with the socket 35 so that the paddles will operate continuously in this adjustment of the head. Ordinarily the agitation of the stucco in continuous mixing will be sufficient to keep the wall of the mixing chamber clean, that is to say free from stucco building up thereon, but at any time the paddle head may be caused to move to its upward position with the clutch 27, 28 in engagement, to clean the wall of the mixing chamber at the top of the chamber; this will ordinarily only be required as a preliminary to stopping the machine. To illustrate the change of the head for continuous mixing, in the general proportion of parts illustrated in Fig. 1, I would say that the head should be raised from its present position about one-third of the distance to the overflow 43.

My invention provides a machine of simple construction for mixing gypsum stucco in a superior manner to obtain a mix of uniform consistency with a thorough incorporation of the water and gypsum and without allowing any objectionable accumulation of set material to form on the paddles or the side walls of the mixing chamber which would delay operations. The construction is such that the operations may be conducted speedily as required with this class of material and in a manner to secure superior mixing results at all times.

Changes in the form, construction and arrangement of parts may be made to satisfy different conditions and for other reasons and I reserve the right to make all such changes as fall within the scope of the following claims.

I claim:

1. In a machine for mixing gypsum stucco, the combination of a mixing chamber, an upper paddle and a lower paddle in said chamber, means for revolving said paddles in opposite directions and at different rates of speed, and means for moving said paddles bodily in said chamber and at the same time automatically discontinuing the revolving movement of the paddles.

2. In a machine for mixing gypsum stucco, the combination of a mixing chamber, an upper paddle and a lower paddle in said chamber, means for revolving said paddles in opposite directions and at different rates of speed, means for moving the paddles bodily in said chamber and at the same time discontinuing the revolving movement of said paddles, and means of resuming the revolving movement of the paddles at a different rate of speed than that of the initial revolving movement.

3. In a machine for mixing gypsum stucco, the combination of an upright mixing chamber, an upper paddle and a lower paddle in said chamber, means for moving said paddles vertically in said chamber and at the same time discontinuing the revolving movement of the paddles, and means for resuming the revolving movement of the paddles at the limit of the upward movement of the paddles and at a different rate of speed than that of the initial revolving movement of the paddles.

4. In a machine for mixing gypsum stucco, the combination of a mixing chamber, a paddle head movable bodily as a plunger in said mixing chamber, an upper paddle and a lower paddle mounted on said head, means for operating said paddles to mix the stucco in the chamber, and means for moving the plunger bodily in the chamber to discharge the mix therefrom.

5. In a machine for mixing gypsum stucco, the combination of a mixing chamber, a paddle head movable bodily as a plunger in said mixing chamber, an upper paddle and a lower paddle mounted on said head, means for operating said paddles in initial position in opposite directions and at different rates of speed to mix the stucco, means for moving the head and paddles bodily in the chamber to discharge the mix therefrom, means for discontinuing the revolving movement of the paddles while the head operates as a plunger, and means for resuming the revolving movement of the paddles as the head reaches the limit of its discharging movement to clean the discharge end of the chamber.

6. In a machine for mixing gypsum stucco, the combination of a mixing chamber, a paddle head in said chamber forming a bottom of the chamber during the mixing operation, means for moving said paddle head upward in the chamber as a plunger to discharge the mix from the chamber, an upper paddle and a lower paddle mounted on said head, a shaft passing through the head for operating the upper paddle, means within the head driven by said shaft and operating the lower paddle at a lower rate of speed than the upper paddle, and means for operating said shaft.

7. In a machine for mixing gypsum stucco, the combination of a mixing chamber, a paddle head arranged to act as a plunger in said chamber, an upper paddle and a lower paddle mounted on said head, a shaft passing through the head for operating the upper paddle, means within the head driven by said shaft and operating the lower paddle at a lower rate of speed than the upper paddle, means for moving the head and paddles bodily in the chamber to discharge the mix, and means for rotating said shaft when the plunger is in initial position and when it is in final discharge position and for automatically discontinuing the rotating movement of the shaft when the head is moving between said positions.

8. In a machine for mixing gypsum stucco, the combination of a mixing chamber, a paddle head arranged to act as a plunger in said chamber, an upper paddle and a lower paddle mounted on said head, a shaft passing through the head for operating the upper paddle, means within the head driven by said shaft and operating the lower paddle at a lower rate of speed than the upper paddle, means for moving the head and paddles bodily in the chamber to discharge the mix, means for operating said shaft, and clutches to engage the shaft with its operating means when the head is in initial mixing position and when it is in final discharge position, and for disengaging the shaft from its operating means when the head is moving between said positions.

9. In a machine for mixing gypsum stucco, the combination of a mixing chamber, a paddle head, an upper paddle and a lower paddle mounted on the head to revolve in opposite directions at the bottom of the chamber, and means for operating the head bodily as a plunger to discharge the mix from said chamber.

10. In a machine for mixing gypsum stucco, the combination of a mixing chamber, a paddle head forming a bottom for said chamber, paddles mounted on said head, and means for moving the head paddle as a plunger in said chamber.

CALEB PAYNE.